United States Patent
Laroque et al.

(10) Patent No.: US 7,639,711 B1
(45) Date of Patent: Dec. 29, 2009

(54) SWITCH PROVIDED WITH A SIGNALING COUPLER, AND A METHOD OF SENDING A SIGNALING MESSAGE

(75) Inventors: Christian Laroque, Rueil Malmaison (FR); Jacques Litteaut, Marly le Roi (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/323,135

(22) Filed: Jun. 1, 1999

(30) Foreign Application Priority Data

Jun. 2, 1998 (FR) .................................. 98 06908

(51) Int. Cl.
*H04J 3/16* (2006.01)

(52) U.S. Cl. .................... 370/465; 370/352; 370/401; 370/389

(58) Field of Classification Search ................. 370/271, 370/282, 294, 357, 359, 386, 389–392, 400, 370/419, 442, 522, 524; 455/466, 515, 70; 379/93.01, 93.05–93.07, 93.09, 93.11, 93.15, 379/229, 258, 353, 355.05, 355.08
See application file for complete search history.

(56) References Cited

U.S. PATENT DOCUMENTS

| | | | | |
|---|---|---|---|---|
| 4,893,335 A | * | 1/1990 | Fuller et al. ................. | 379/199 |
| 5,224,108 A | * | 6/1993 | McDysan et al. ........... | 370/522 |
| 5,392,283 A | * | 2/1995 | Bocci et al. ................. | 370/329 |
| 5,420,916 A | | 5/1995 | Sekiguchi | |
| 5,668,955 A | * | 9/1997 | deCiutiis et al. ............ | 379/130 |
| 5,675,634 A | * | 10/1997 | Park ......................... | 379/88.16 |
| 5,715,241 A | * | 2/1998 | Glass et al. ................. | 370/252 |
| 5,940,438 A | * | 8/1999 | Poon et al. .................. | 375/222 |
| 5,949,871 A | * | 9/1999 | Kabay et al. ................ | 379/229 |
| 5,995,595 A | * | 11/1999 | Hickey et al. ............ | 379/88.12 |
| 6,049,544 A | * | 4/2000 | Kurdzo et al. .......... | 370/395.64 |
| 6,167,122 A | * | 12/2000 | Titmuss et al. ........... | 379/93.15 |
| 6,324,280 B2 | * | 11/2001 | Dunn et al. .................. | 379/230 |
| 6,349,133 B1 | * | 2/2002 | Matthews et al. ........ | 379/90.01 |
| 6,411,684 B1 | * | 6/2002 | Cohn et al. .............. | 379/88.14 |
| 6,516,355 B1 | * | 2/2003 | Hartmann et al. ........... | 719/317 |
| 6,594,353 B1 | * | 7/2003 | Weinhappl .................. | 379/196 |

FOREIGN PATENT DOCUMENTS

| | | |
|---|---|---|
| DE | 196 44 787 C1 | 4/1998 |
| EP | 0 788 283 A2 | 8/1997 |
| FR | 2 728 749 A1 | 6/1996 |

OTHER PUBLICATIONS

Kun, Randall D., "ISDN D Channel Handler", Feb. 7, 1989, U.S. Statutory Invention Registration No. H586.*

* cited by examiner

*Primary Examiner*—Michael J Moore, Jr.
(74) *Attorney, Agent, or Firm*—Sughrue Mion, PLLC

(57) ABSTRACT

To simplify the sending of signalling messages, a coupler of a switch is provided with an interpreter. The interpreter is capable of preparing the sending of a signalling message as soon as it receives an order of predetermined syntax. By acting in this way, the transmission of signalling messages is made transparent to the variety of protocols that might be used.

29 Claims, 2 Drawing Sheets

SWITCH PROVIDED WITH A SIGNALING COUPLER, AND A METHOD OF SENDING A SIGNALING MESSAGE

The present invention relates to a switch provided with a signaling coupler. The invention also provides a method of sending signaling messages. It is used mainly in the field of telecommunications for the purpose of transmitting signaling signals that are used in particular in controlling telephone exchanges, i.e. private or public switches. The object of the invention is to make the transmission of signaling signals more transparent in spite of the variety of transmission techniques and protocols adopted.

BACKGROUND OF THE INVENTION

In communications networks interconnecting a plurality of exchanges (private or public), calls are distributed amongst channels. Thus, in more or less general terms, so-called "B" channels are known which are general-purpose channels for conveying messages between various parties. The parties may be people in which case the messages can be voice messages. The parties can also be machines, in which case the messages will be digitized data messages. In practice, analog transmission for messages between people is being abandoned in favor of digital transmission, since transmission quality is better.

Besides such general-purpose channels, there are so-called "D" channels which serve to carry signaling data. In operation exchanges, or switches, need to send each other messages concerning their availability and their mode of operation. For example, if a telephone exchange is connected to a base station of a time division multiple access (TDMA) type mobile telephone network, it is necessary to transmit synchronization, and to transmit the time to the various mobile stations which seek to come into contact with the base station. In another example, in the X25 protocol, before a message can be sent, it is necessary to deliver information to the circuits that are in the traffic concerning the time position and the encapsulation data that is to be placed around the message.

To simplify explanation, it is recalled that in a digitized communications system in France there exist so-called "T2" services which thus comprise for the user thirty "B" channels for conveying speech, and one "D" channel for conveying signaling messages.

The problem of managing signaling messages is essentially associated with the protocol which organizes a link between two telephone exchanges. For any one such link, the protocol is known by the two exchanges involved, and signaling messages can normally be conveyed between them. If a signaling message needs to be forwarded to another exchange using a link that has the same protocol for transmitting signaling messages, then the signaling message can be forwarded as such. It will be correctly interpreted by the end exchange.

However, a problem arises within a network that is 20 not uniform, in that it contains a variety of communications channels. Under such circumstances, either the signaling message cannot be conveyed or, in order to enable it to be conveyed, an exchange in the network at which links using different protocols terminate must include as many transcoders for forwarding signaling messages as there are pairs of different transmission protocols for such signaling messages. Given the present wide variety of signaling channels, and given the wide variety of protocols that can be used within these channels, such signaling message transcoding is not undertaken. The whole advantage of signaling channels is lost once the network is not uniform.

OBJECTS AND SUMMARY OF THE INVENTION

An object of the invention is to remedy this problem by proposing a generic solution which can be adapted without difficulty to any possible variety of transmission protocols for signaling signals. In the invention the modification to the equipment is always the same, thereby reducing the cost of such equipment which can be mass-produced. The principle of the invention is based on two main means. Firstly, the sending of a signaling message is given the syntax of a predetermined order (instruction). The predetermined order is always the same, whatever the resources available in a telephone exchange for conveying a signaling message. Secondly, physically, each exchange, each switch, has an interpreter for producing a signaling configuration that corresponds to the signaling message transmission resources accessible from the communications exchange, and the interpreter is set into operation in response to receiving said predetermined order.

In the invention, proposals are also made to use, for said predetermined order, a syntax that is specific to a known transmission channel. This most widespread known transmission channel for signaling signals is the channel used in the state of the art for channels of the T2 type mentioned above. Under such conditions, each telephone exchange is capable of transmitting the signaling message using its own protocols without having to develop special equipment.

The present invention thus provides a switch provided with a signaling coupler, the switch including an interpreter to produce a signaling configuration on receiving a predetermined character string corresponding to an order to send a signaling message, the signaling configuration depending on the signaling resources accessible to the coupler.

The invention also provides a method of sending a signaling message by a telephone exchange, the method comprising the following steps:

a predetermined character string corresponding to a predetermined send order for said signaling message is added to said signaling message; and said send order is interpreted in an interpreter of a switch to produce a signaling configuration of said switch, the signaling configuration depending on the signaling resources available to the switch.

BRIEF DESCRIPTION OF THE DRAWINGS

The invention will be better understood on reading the following description and on examining the accompanying figures. The figures are given by way of non-limiting indication of the invention. In the figures.

MORE DETAILED DESCRIPTION

Figure 1:
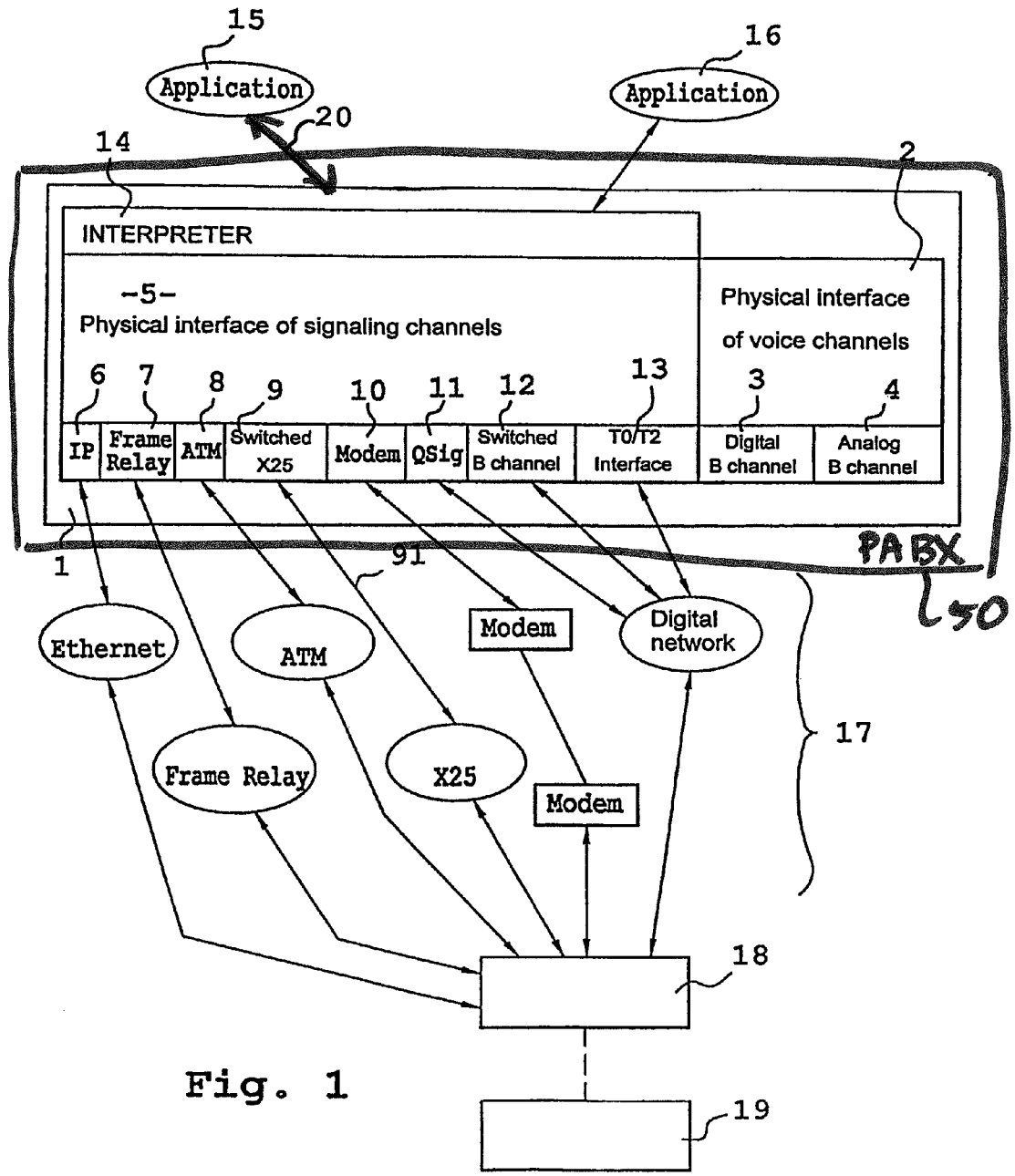
FIG. 1 shows a signaling coupler of the invention usable in a switch.

FIG. 1 shows a signaling coupler 1 of the invention. The coupler 1 is designed to be placed in a telephone exchange PABX 50 having channels for carrying signaling data between a network inlet and a network outlet. In conventional manner, the coupler 1 has a physical interface 2 with general-purpose data transmission channels B. The interface 2 can thus be connected to a digital B channel output 3 or to an analog B channel output 4. The coupler 1 also has a physical interface 5 for transmitting signaling signals. This physical interface, the subject matter of the invention, can thus have various circuits 6 to 13 relating to interfacing different protocols. In non-exhaustive manner, these can comprise, IP protocols usable for an Ethernet network, the frame relay protocol for a network of the same type, the ATM protocol, the switched X25 protocol, a generic modem protocol (including all possible varieties of compression modes and bit rate), a QSIG protocol, and a switched B channel protocol. It may also relate to an interface of conventional type in the T0 or T2 format. The three last-mentioned protocols apply to digital networks.

According to the invention, the interface 5 for transmitting signaling messages is separated from members 15 or 16 that generate such messages by means of an interpreter module 14. As explained below, the interpreter module 14 is capable of running the program of FIG. 2 to transform a signaling message as delivered by a member 15 or 16 into a message that is easily transmissible in a communications network 17 possibly possessing transmission protocol converters at interposed nodes 18 prior to the signaling message reaching an exchange 19 to which it is addressed. In practice, the members 15 or 16, insofar as they are intended essentially to organize calls between exchange 1 and exchange 18 or exchange 19, are normally peripherals of exchange 1. Nevertheless, there is nothing to prevent these members 15 and 16 being external and even for the signaling messages they deliver coming from a signaling link.

In the state of the art, as mentioned above, a member 15 seeking to send a signaling message needed itself to be connected directly to one of the interfaces 6 to 13. The specific message then needed to be processed in the interface 6 to 13 so as to put it into a form (known in advance) suitable for enabling it to be incorporated in the traffic of the network 17.

In the invention, an access 20 to the interpreter 14 is specific to a signaling channel: all messages reaching the access 20 coming from a member 15 or 16 must be considered as being signaling messages by the very fact that they arrive on a signaling channel. They are dealt with accordingly.

In the invention, the interpreter 14 thus needs to select the signaling configuration of the coupler 1 50 as to enable it to adapt, preferably in real time and without extra cost, to transmitting the signaling messages it receives via its access 20 (using a protocol specific thereto), while in the member 15 or in the member 16 it is not known how the signaling channel is implemented. The access 20 can be a distinct physical access or a particular way of addressing a communications bus.

Figure 2:
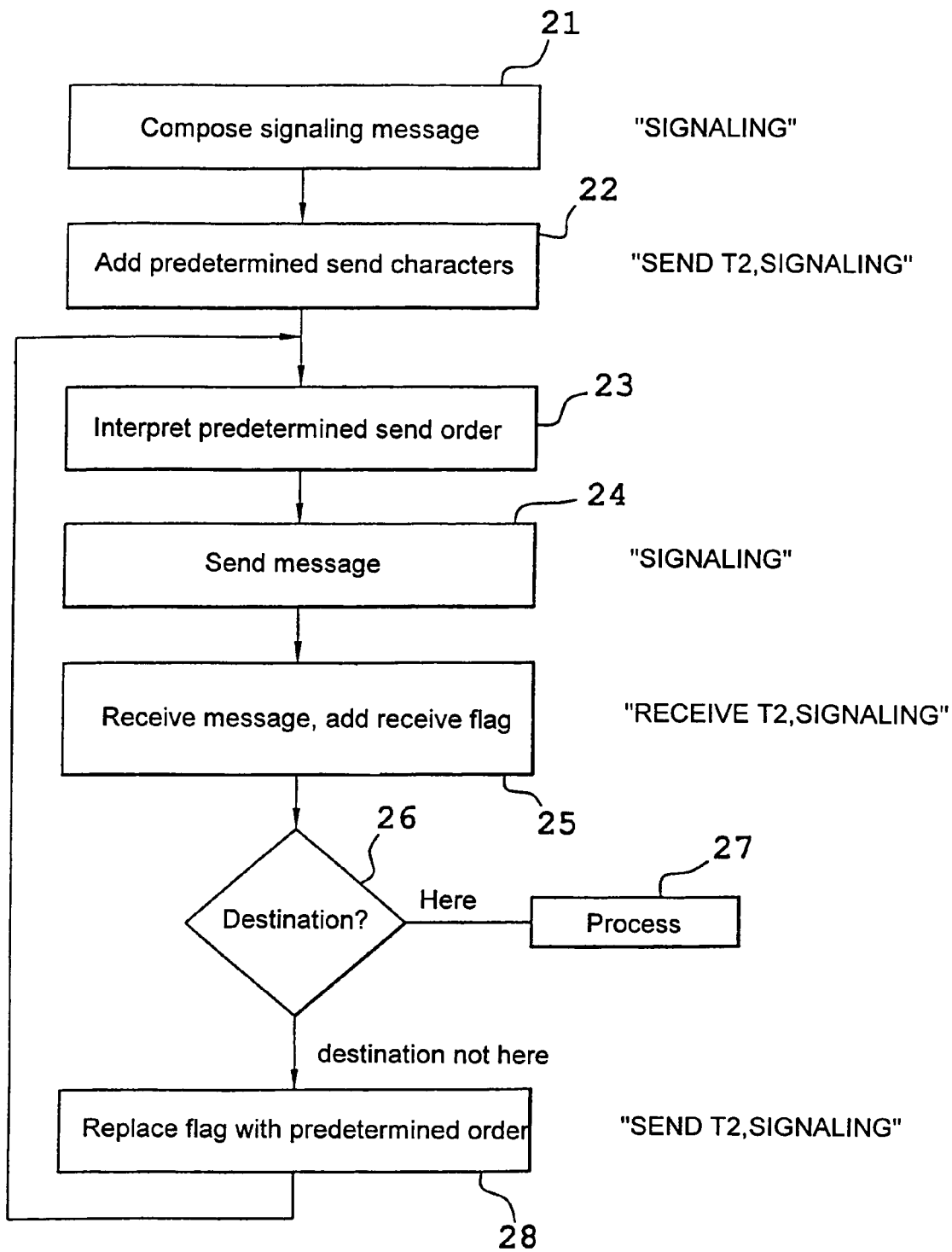
FIG. 2 shows the essential steps in the method of the invention.

FIG. 2 thus shows a step 21 in which a signaling message "SIGNALING" is composed by an operator in a member 15. In other words, the signaling message is produced by the member 15 and it is sent to the interpreter 14. In the interpreter 14, the message "SIGNALING" produced by the member 15 receives a predetermined additional character string in an operation 22, which string is always the same. This character string represents a send order. For example, the predetermined send string can correspond to the instruction "SEND T2" that is used in particular in the above-mentioned T2 type protocol to send a signaling message. It should be observed that this predetermined send order "SEND T2" is added to the message "SIGNALING" whatever the protocol that is to be used thereafter for conveying it to the exchange 19. This builds up a phrase: "SEND T2, SIGNALING". The character string "SEND T2" is located, for example, at the beginning of the phrase that is built up.

During an operation 23, the interpreter 14 then responds to the received phrase by interpreting the character string "SEND T2" (at the beginning thereof) representing the predetermined send order. In so doing, this interpretation consists in adapting the encapsulation of the message "SIGNALING" (i.e. without "SEND T2") to a signaling message transmission protocol available in the interface 5, and in putting into operation the corresponding interface 6 to 13. For example, if only one of the interfaces is available, e.g. the switched X25 interface 9, then the interpretation of the predetermined send order will consist in configuring the signaling of the coupler 1 so that the signaling message "SIGNALING" that it has just received is conveyed over a link 91 connected to the interface 9. In conventional manner, this configuration will include appropriate switching in the interface circuits 9, and possibly also modification of the message "SIGNALING" in order to encapsulate it.

If the interface 5 has a variety of signaling link options open to it, provision can be made for it to select the option concerning the link which makes it possible to reach exchange 18, or even if a plurality of links are available, to select the link which is available first chronologically, in a hierarchical order.

Then during a step 24, the signaling message is indeed sent.

On reception, the signaling message "SIGNALING" is applied to an input of another coupler 1 likewise installed, in accordance with the invention, in the exchange 18. In the coupler 1 in this other exchange 18, the signaling message "SIGNALING" is again interpreted in an interpreter 14 during a step 25. The coupler 1 of its other exchange 18 thus preferably has a second access for signaling messages coming from an upstream exchange, and that might need to be forwarded. The messages admitted to this second access are then subjected to processing that is different from that applied to messages coming from message-producing members 15 or 16 that are admitted on the access 20.

During the step 25, the message "SIGNALING" that has been conveyed thereto is thus given a receive flag. In practice, it is preferable to adopt a character string corresponding to a known type of flag, entitled "RECEIVE T2", and usable in the T2 protocol. During a test 26 after the flag has been added, the exchange 18 that receives the message looks in the content of this message "RECEIVE T2, SIGNALING" to see whether the destination has been reached. If the destination has been reached, the signaling message is subjected to processing 27 in the same manner as in the state of the art.

However, if exchange 18 is not the destination, then the interpreter 14 in this other exchange 18 causes the receive flag "RECEIVE T2" to be replaced, in a step 28, by the predetermined character string "SEND T2" corresponding to the send order. The interpreter 14 in this other exchange then, in its turn, runs step 23 60 that the message is sent on from this other exchange 18, using a protocol for conveying signaling messages that is available in this other exchange. The message is thus forwarded in this way until it ends up by reaching the destination exchange 19 where it is processed for execution purposes.

It can thus be seen that by operating in this way the message "SIGNALING" is transmitted transparently through the various physical interfaces 2 to 13 of the signaling channels between exchanges, and that transmission of the message no longer depends on the specific physical means actually available in the interfaces 5. By adopting such a configuration, differences between various networks cease to be relevant. In practice, an interpreter 14 comprises a microprocessor associated with the program. Alternatively it can be a working session in a processor running a switch. As a result the interpreter 14 does not require any additional circuitry, only some additional programming. The processor, or the dedicated microprocessor, then performs the required processing and switching in application of the program.

The invention claimed is:

1. A circuit switch comprising:
   a coupler accessing signaling channels to transmit signaling messages;
   an interpreter producing a signaling configuration upon receiving an order to send a signaling message, wherein a type of signaling channel is selected depending on which signaling channels are available to the coupler, and where the signaling configuration produced depends on the selected type of signaling channel; and
   a receiver for adding a receive flag to a received signaling message,
   wherein the order is a predetermined constant character string; and
   wherein the receive flag is an internal flag of the switch and is not transmitted with the signaling message from the switch.

2. The switch according to claim 1, wherein the coupler further comprises:
   a detector recognizing whether the received signaling message is addressed to the switch based on a destination of the received signaling message;
   a processor processing the signaling message when the switch is the destination for the signaling message; and
   a translator replacing the receive flag with the predetermined character string when the switch is not the destination for the signaling message.

3. A method of sending a signaling message by a circuit switch, the method comprising:
   receiving said signaling message in a receiving exchange of said switch and adding a receive flag to said signaling message;
   adding to said signaling message a predetermined send order for said signaling message;
   interpreting said send order in an interpreter of the switch to produce a signaling configuration of said switch; and
   outputting, from the circuit switch, the signaling message with the added predetermined send order and in the produced signaling configuration,
   wherein the signaling configuration produced depends on a selected type of signaling channel, and the type of signaling channel is selected from the signaling channels available to the switch,
   wherein the receive flag is a specified constant and the predetermined send order is a specified constant character string, and
   wherein the receive flag is an internal flag of the switch and is not transmitted with the signaling message from the switch.

4. The method according to claim 3, wherein, to add the predetermined character string to the signaling message:
   the destination of said signaling message is tested; and
   if a destination of the signaling message is different from said receiving exchange, the flag is replaced by said predetermined character string.

5. The method of claim 3, wherein said interpreter is configured to process at least one of: an IP protocol, a frame relay protocol, an ATM protocol, a switched X25 protocol, a generic modem protocol and a switched B channel protocol.

6. The method of claim 3, wherein said interpreter is one of (a) a microprocessor associated with a program and (b) a working session in a processor running said switch.

7. The switch of claim 1, wherein said interpreter comprises a circuit configured to process at least one of: an IP protocol, a frame relay protocol, an ATM protocol, a switched X25 protocol, a generic modem protocol and a switched B channel protocol.

8. The switch of claim 1, wherein said interpreter comprises one of (a) a microprocessor associated with a program and (b) a working session in a processor running said switch.

9. A circuit switch comprising:
   a coupler accessing signaling channels to transmit signaling messages;
   an interpreter producing a signaling configuration upon receiving an order to send a signaling message, the signaling configuration produced depends on a type of the signaling channels accessible to the coupler; and
   a receiver for adding a receive flag for internal use only to a received signaling message,
   wherein the order is a predetermined constant character string,
   wherein the coupler comprises:
   a detector recognizing whether the received signaling message is addressed to the switch,
   a processor processing the signaling message when the switch is a destination for the signaling message, and
   a translator replacing the receive flag with the predetermined character string when the switch is not the destination for the signaling message, and
   wherein the coupler has a plurality of interfaces, wherein each of said interfaces provides access to one of said channels and wherein when a plurality of signaling channels are available to transmit said signaling message, a next available signaling channel is selected in a chronological order and the signaling message is configured to produce the signaling configuration for the next available signaling channel.

10. The switch according to claim 9, wherein the predetermined constant character string remains unchanged regardless of a type of the available signaling channels.

11. The switch of claim 2, wherein when the signaling message is received by the switch, the receiver adds a receive flag to the signaling message and the detector checks the signaling message for the receive flag to determine whether the switch is a designated destination for the signaling message.

12. The switch of claim 2, wherein, when the detector recognizes that the received signaling message is not addressed to the switch based on the destination, the detector forwards the received signaling message to the translator, and wherein, when the translator receives the signaling message from the detector, the translator replaces the receive flag with the predetermined constant character string regardless of the destination for the signaling message.

13. The switch according to claim 12, wherein when the switch is not the destination, the translator replaces the receive flag with the predetermined constant character string regardless of the signaling configuration of said signaling message.

14. The method according to claim 3, wherein, when the switch adds the send order to the signaling message, the switch selects the type of signaling channel from the signaling channels available at the switch for transmitting the signaling message, and the interpreter of the switch produces the signaling configuration for the signaling message based on the selected type of signaling channel.

15. A circuit switch comprising:
   a coupler accessing signaling channels of different types to transmit signaling messages;

an interpreter producing a signaling configuration upon receiving an order to send a signaling message, wherein the signaling configuration produced for the signaling message depends on a selected type of signaling channel, and wherein the type of signaling channel is selected from different types of the signaling channels available at the coupler to transmit signaling messages; and a receiver for adding a receive flag for internal use only to a received signaling message, wherein the order is a predetermined constant character string, and wherein the selection of the type of signaling channel for producing the signaling configuration is based on a predetermined criteria.

16. The switch according to claim 15, wherein the coupler has a plurality of interfaces, wherein each of said interfaces provides access to one of said channels, and wherein when a plurality of signaling channels are available to transmit said signaling message, an available signaling channel is selected based on the predetermined criteria and the signaling message is configured to produce the signaling configuration for the available signaling channel.

17. A computer program embodied on a microprocessor, the program having instructions, the instructions comprising:

accessing signaling channels by a coupler to transmit signaling messages;

producing a signaling configuration upon receiving an order to send a signaling message, wherein a type of signaling channel is selected depending on the signaling channels available to the coupler; and wherein the signaling configuration produced depends on the selected type of signaling channel;

adding a receive flag to a received signaling message; and outputting the signaling message with the produced signaling configuration, wherein the order is a predetermined constant character string; and wherein the receive flag is an internal flag of the switch and is not transmitted with the signaling message from the switch.

18. A computer program embodied on a microprocessor, the program having instructions, the instructions comprising:

receiving a signaling message in a receiving exchange of a switch and adding a receive flag to said signaling message;

adding to said signaling message a predetermined send order for said signaling message;

interpreting said send order in an interpreter of the switch to produce a signaling configuration of said switch; and outputting, from the circuit switch, the signaling message with the added predetermined send order and in the produced signaling configuration, wherein the signaling configuration produced depends on a selected type of signaling channel, and the type of signaling channel is selected depending on the signaling channels available to the switch, wherein the receive flag is a specified constant and the predetermined send order is a specified constant character string, and wherein the receive flag is an internal flag of the switch and is not transmitted with the signaling message from the switch.

19. A computer program embodied on a microprocessor, the program having instructions, the instructions comprising:

accessing signaling channels by a coupler to transmit signaling messages;

producing a signaling configuration upon receiving an order to send a signaling message, wherein the signaling configuration produced depends on a type of the signaling channels accessible to the coupler; and adding a receive flag to a received signaling message, wherein the order is a predetermined constant character string, wherein said accessing of the signaling channels comprises:

recognizing whether the received signaling message is addressed to a switch, processing the signaling message when the switch is a destination for the signaling message, and replacing the receive flag with the predetermined character string when the switch is not the destination for the signaling message; and wherein the receive flag is an internal flag of the switch and is not transmitted with the signaling message from the switch.

20. The computer program according to claim 19, wherein the coupler comprises a plurality of interfaces, wherein each of said interfaces provides access to one of said channels, and wherein, when the plurality of signaling channels are available to transmit said signaling message, a next available signaling channel is selected in a chronological order and the signaling message is configured to produce the signaling configuration for the next available signaling channel.

21. The computer program according to claim 17, wherein the selection of the type of signaling channel for producing the signaling configuration is based on a predetermined criteria.

22. The switch according to claim 1, wherein the receive flag is replaced when the switch is not the destination of the signaling message.

23. The switch according to claim 1, wherein the switch only internally uses the receive flag of the received signaling message.

24. The switch according to claim 1, wherein the receive flag is an instruction instructing a processor of the switch to process the signaling message.

25. The switch according to claim 1 wherein the predetermined constant character string is the same for all telephone exchanges.

26. The switch according to claim 1, wherein the predetermined constant character string is a predetermined syntax specific to the signaling channel.

27. The switch according to claim 1, wherein the receive flag is added to the signaling message upon receipt of the signaling message at a second interpreter.

28. The switch according to claim 1, wherein the predetermined character string received by the interpreter is always a same character string regardless of the type of signaling channel that is to be used to send the signaling message.

29. The switch according to claim 1, wherein a physical interface of the signaling channels is capable of transmitting messages using at least one of an IP protocol, an asynchronous transfer mode (ATM) protocol, a switched X25 protocol, a generic modem protocol, a Q interface signaling (QSIG) protocol and a switched B channel protocol.

* * * * *